No. 866,750. PATENTED SEPT. 24, 1907.
J. G. VINCENT.
POWER DRIVE FOR ADDING MACHINES.
APPLICATION FILED JAN. 22, 1907.

5 SHEETS—SHEET 1.

Witnesses
Edw. P. Barrett
Louis B. Erwin

Inventor
Jesse G. Vincent
By Rector Hibben Davis
his Attys.

No. 866,750. PATENTED SEPT. 24, 1907.
J. G. VINCENT.
POWER DRIVE FOR ADDING MACHINES.
APPLICATION FILED JAN. 22, 1907.

5 SHEETS—SHEET 4.

Witnesses
Edw. P. Barrett
Louis B. Erwin

Inventor
Jesse G. Vincent
By Rector Hibben Davis
His Attys

No. 866,750. PATENTED SEPT. 24, 1907.
J. G. VINCENT.
POWER DRIVE FOR ADDING MACHINES.
APPLICATION FILED JAN. 22, 1907.

5 SHEETS—SHEET 5.

Witnesses:
Edw. R. Barrett
Louis B. Erwin

Inventor
Jesse G. Vincent
Rector Holden Davis
his Attys

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

POWER-DRIVE FOR ADDING-MACHINES.

No. 866,750.  Specification of Letters Patent.  Patented Sept. 24, 1907.

Application filed January 22, 1907. Serial No. 353,491.

*To all whom it may concern:*

Be it known that I, JESSE G. VINCENT, a citizen of the United States, residing at Detroit, in the county of Wayne and State of Michigan, have invented certain new and useful Improvements in Power-Drives for Adding-Machines, of which the following is a specification.

It has been found in practice that where adding machines or the like are to be operated by power as by an electric motor it is preferable to have the motor run continuously. This of course necessitates the provision of clutch mechanism so that the working parts of the adding machine can be operatively connected with the motor at the will of the operator. Various forms of means have been devised for effecting this operative connection and for discontinuing the same automatically upon the completion of a cycle of operation of the adding machine.

The chief object of the present invention is to provide for effecting a positive clutching action with unerring accuracy, by the use of simplified mechanism of great durability.

With the above stated and incidental objects in view the invention consists in certain novel features of construction and combinations of parts the essential elements whereof are recited in the appended claims and a preferred form of embodiment of which is described in detail hereinafter and illustrated in the accompanying drawings forming part of this specification.

Figure 1:
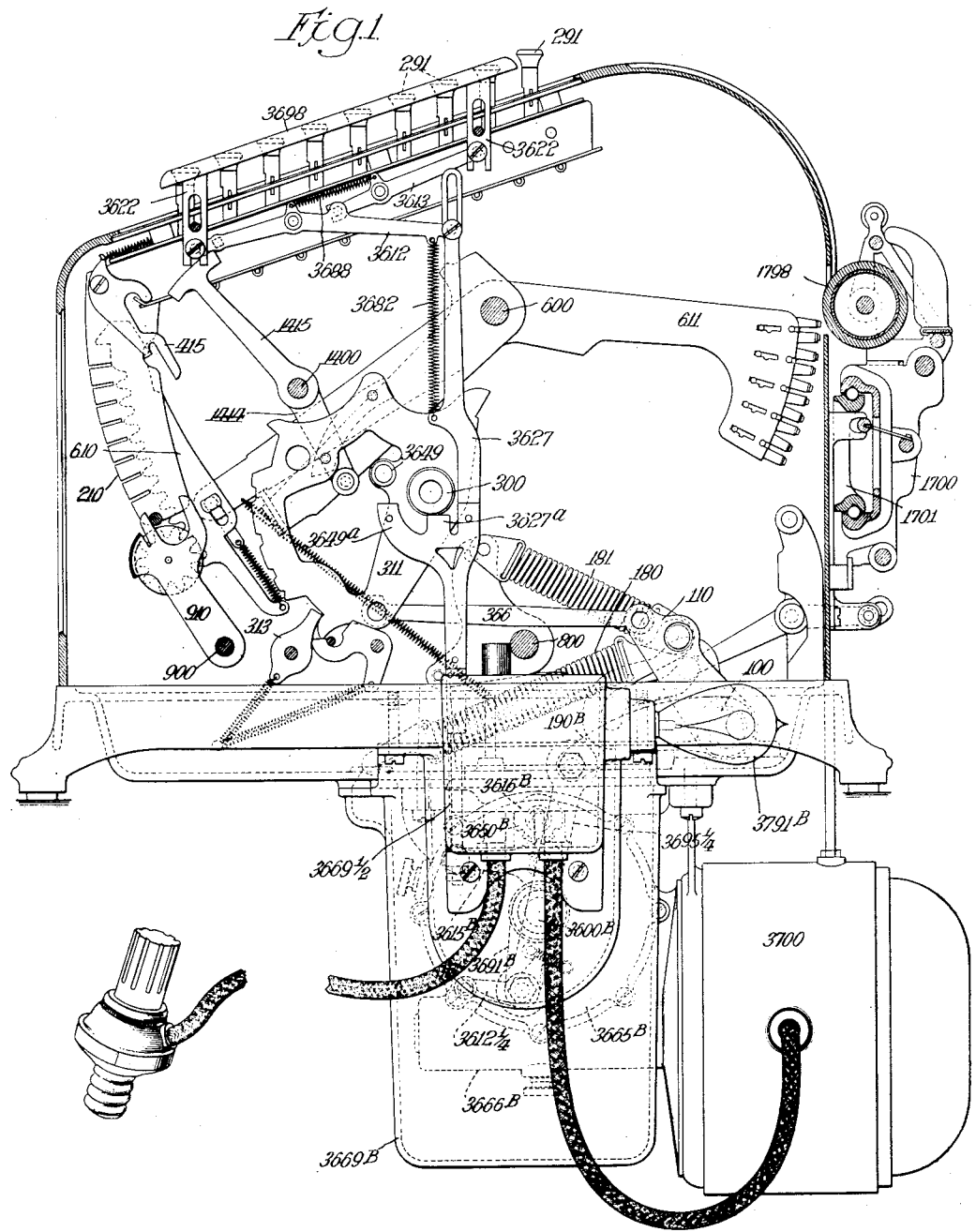
Figure 2:
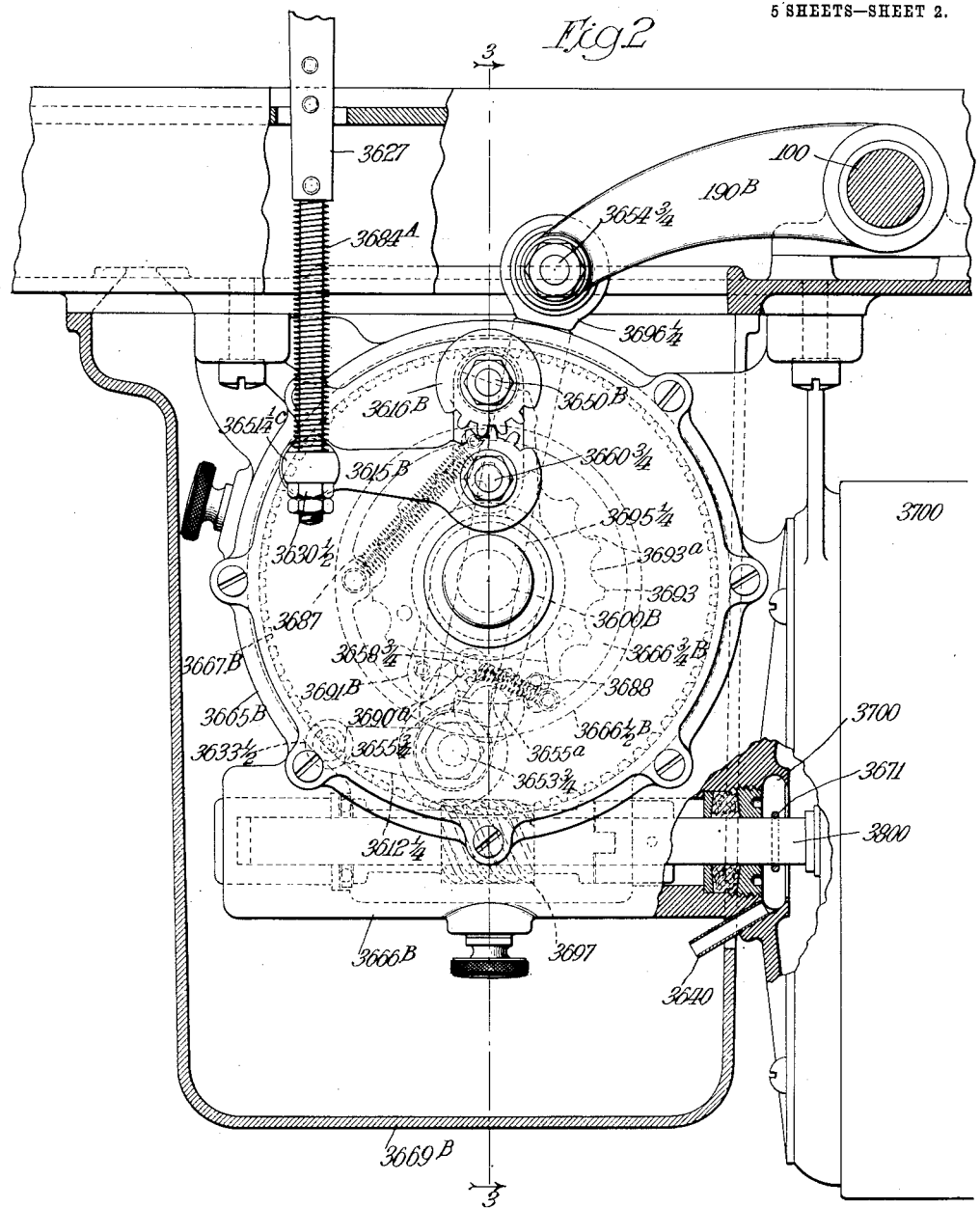
Figure 3:
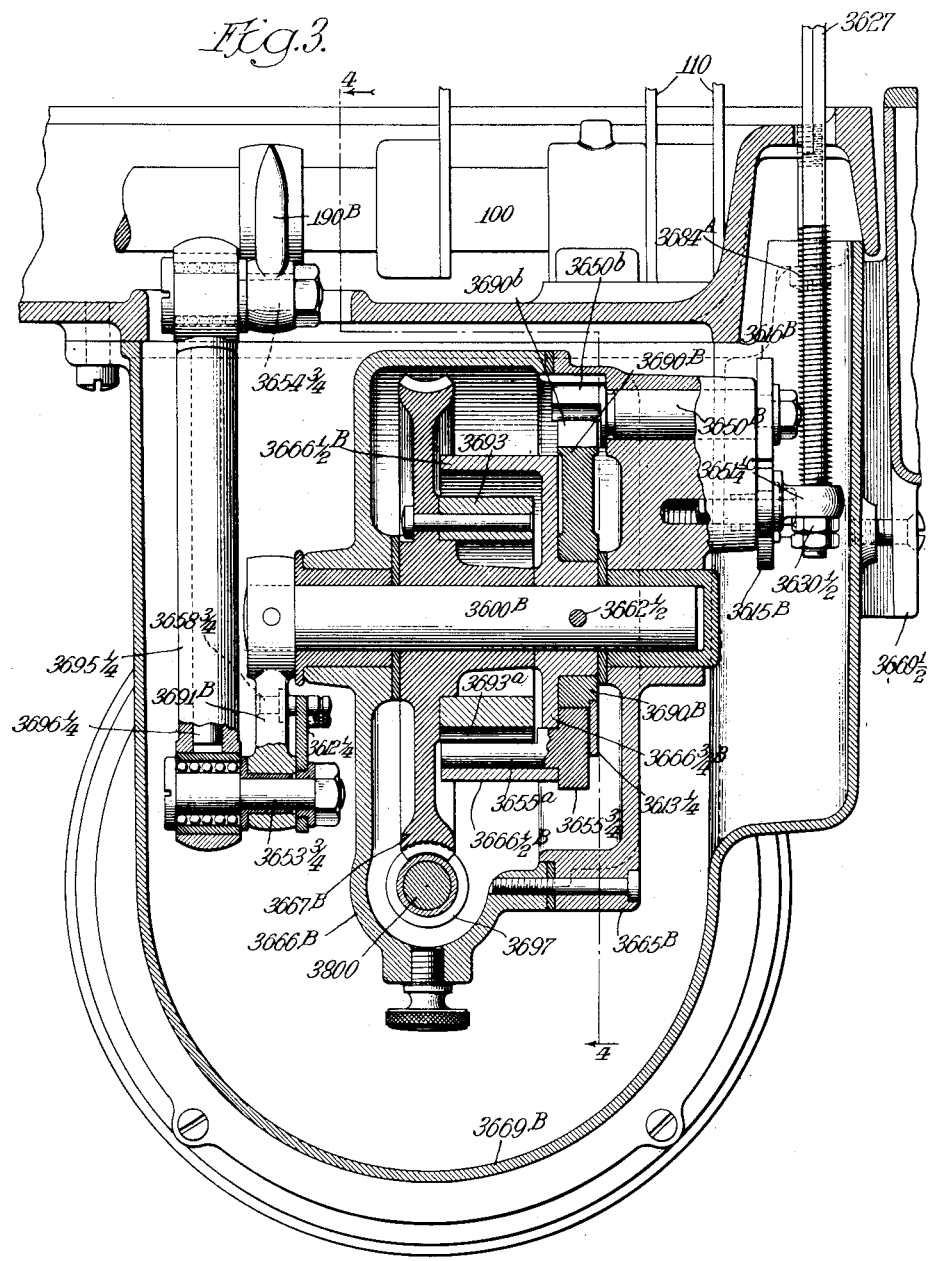
Figure 4:
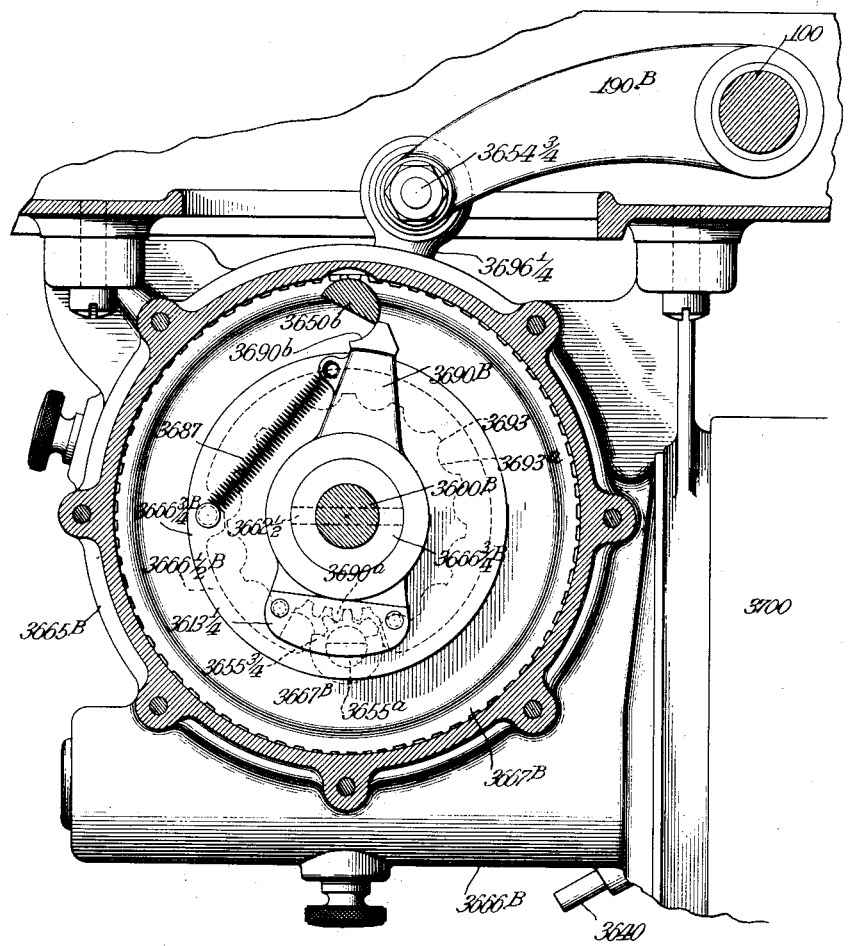
Figure 5:
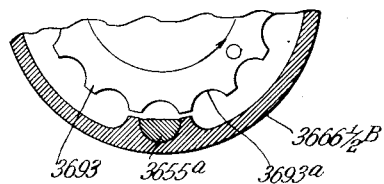
Figure 6:
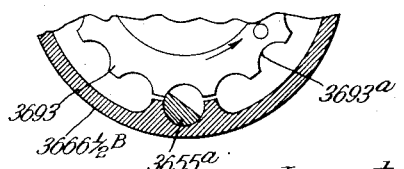
Figure 7:
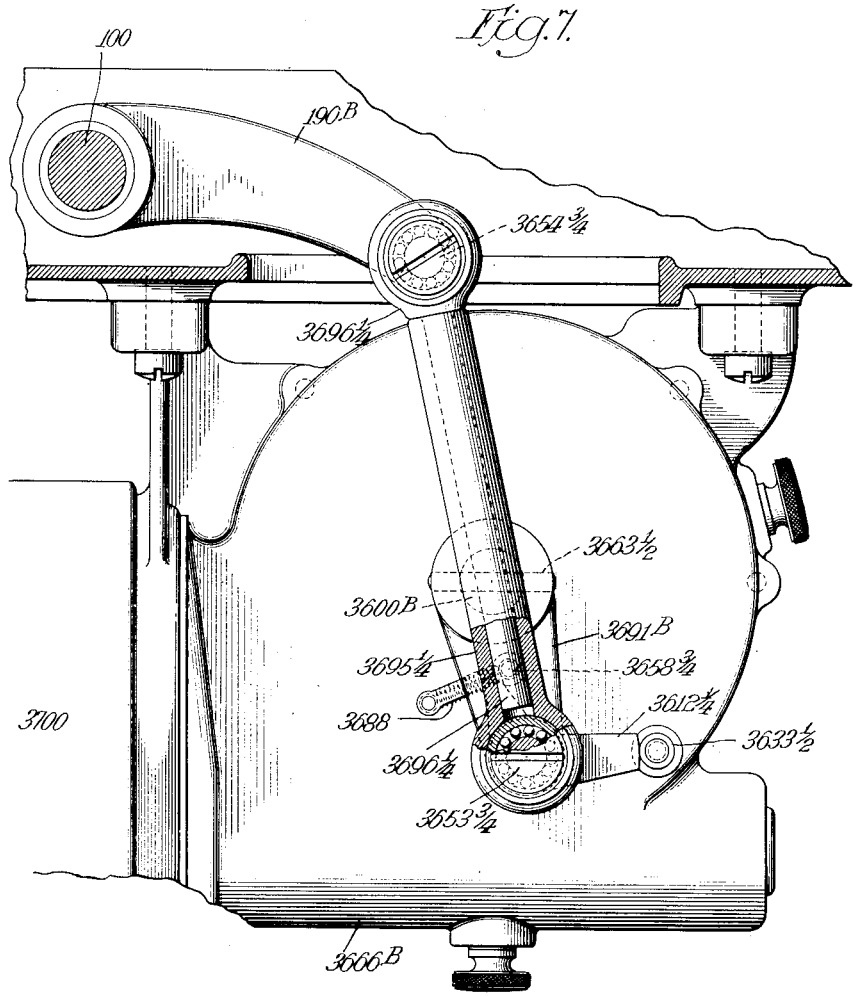
Figure 8:
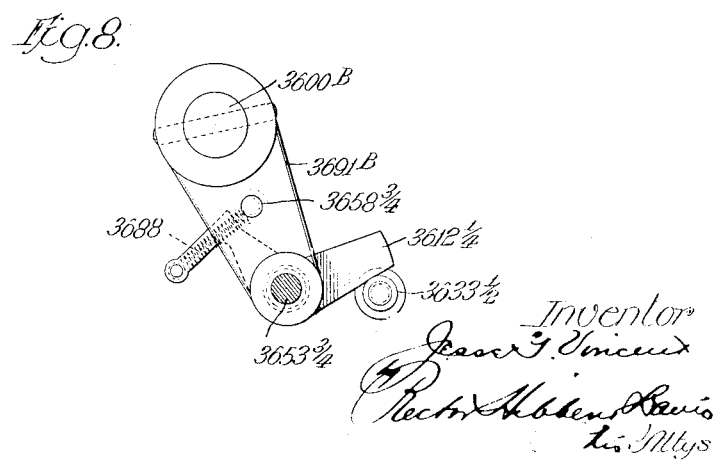

Of said drawings Figure 1 represents partly in right-side elevation and partly in vertical section an adding and listing machine of the well-known Burroughs type equipped for operation by an electric motor and provided with the improvements of the present invention; Fig. 2 represents on an enlarged scale and in right-side elevation the gear casing which incloses the clutch mechanism, together with starting devices and driving connections for the adding machine, this view showing an oil casing in section as also a stuffing box for the armature shaft of the electric motor; Fig. 3 is a vertical transverse section taken on the line 3—3 of Fig. 2; Fig. 4 is a sectional right-side elevation taken on the line 4—4 of Fig. 3; Figs. 5 and 6 are sectional details illustrating the action of a clutch dog; Fig. 7 is a left-side elevation of the motor attachment with some parts broken away and in section; and Fig. 8 is a detail elevation of a certain crank arm and back-stop devices illustrating a changed relation of parts as compared with Fig. 7.

The invention is by preference illustrated in a form adapted to the Burroughs adding and listing machine although it is to be understood that it is not necessarily so limited in its adaptation. For the details of this Burroughs machine reference may be had to the William S. Burroughs Patents Nos. 504,963 and 505,078 of June 12, 1893. For the purposes of the present specification it is unnecessary to give any extended description of this adding and listing machine. It will suffice to designate a few of its working parts with which the power drive is more immediately associated.

Referring first to Fig. 1 the reference numeral 300 designates the usual tubular stub shaft to which it is customary to apply a detachable handle when the machine is operated by hand. This shaft carries the usual sector 311 which is connected by a link 366 with a crank arm 110 on a rock-shaft 100. This rock-shaft is operatively connected through the medium of stout springs 181 with the main parts of the adding machine and as usual other springs 180 return the rock-shaft to normal after it has been operated either by drawing forward the handle applied to the shaft 300 or by the action of the power drive. The latter is suspended from the base of the machine and the reference numeral 3700 designates the casing of an electric motor with which casing is united a gear casing 3666$^B$. The armature shaft 3800 (Fig. 2) extends through a stuffing box into the gear casing and on the motor side of this stuffing box a spring ring 3671 is clasped on the shaft to catch any oil which works through the stuffing box and cause such oil to either drip or be thrown off by centrifugal force into a groove 3700$^a$ formed in the motor casing. The gear casing is surrounded by an outer casing 3669$^B$ to collect any oil escaping from any part of the drive, a short tube or spout 3640 extending from the groove 3700$^a$ into such outer casing. Through these means the dripping of oil onto floors or floor coverings in offices or other places where the adding machine is used will be absolutely prevented.

A switch box 3669½ is secured to the outer casing so as to have a convenient location at the right-hand side of the machine and the switch employed is preferably of the push button double throw type. An incandescent lamp 3791$^B$ is preferably mounted upon the switch box and suitably wired to show when the current is on.

The armature shaft connects with a worm 3697 suitably journaled in the gear casing (see dotted lines, Fig. 2) and this worm meshes with a worm-wheel 3667$^B$ loose upon a shaft 3600$^B$ journaled in a central bearing of the gear casing and in a similarly located bearing in the casing cap 3665$^B$ (Fig. 3). Such shaft is adapted to be operatively connected with the worm-wheel through clutch mechanism presently to be described and said shaft has affixed to one end a crank arm 3691$^B$ which is coupled by a wrist-pin 3653¾ with the tubular member 3695¼ of a telescopic pitman whose rod-like member 3696¼ is coupled by a wrist-pin 3654¾ to a crank arm 190$^B$ affixed to the rock-shaft 100. It will be obvious that rotation of the shaft 3600$^B$ and its crank arm will result in turning this shaft 100 in one direction through the connections described and that the telescopic character of the pitman provides for restoration of the latter shaft by the springs 180.

Coming now to the clutch mechanism there is fixedly secured to one side of the worm-wheel 3667$^B$ a ring or annulus 3693 (Fig. 3) whose periphery is formed throughout with a series of grooves or notches 3693$^a$ (Figs. 5 and 6) extending from side to side of the annulus and each struck on a similar arc of a circle. This annulus is encircled by the flange 3666½$^B$ of a disk 3666¾$^B$ whose hub is rigidly secured to the shaft 3600$^B$ by a pin 3662½ (Fig. 3). In said disk there is journaled a clutch dog in the form of a pin having a semicylindrical portion 3655$^a$ extending across the periphery of the notched or grooved annulus as shown in Fig. 3. This pin has a head 3655¾ which (as shown in dotted lines, Fig. 4) takes the form of a mutilated gear wheel having a limited number of teeth in mesh with a segment of a gear 3690$^a$ formed upon the underside of an arm 3690$^B$. This arm is journaled upon the hub of the disk 3666¾$^B$ and projected downwardly at both ends of the gear segment so as to be limited in oscillation by abutment against the head 3655¾ of the clutch pin (see Fig. 4). A plate 3613¼ is secured to these projecting portions of the arm and extends across the head of the pin and the gear segment for the purpose of confining the pin in place and keeping the gears in proper mesh. The arm projects on the side of the disk hub opposite that where the gears are located and is formed with a head cut out in one side on the arc of a circle as illustrated at 3690$^b$ (Fig. 4). A spiral spring 3687 connects the upwardly projecting part of the arm with a stud fastened in the disk 3666¾$^B$ and normally holds the arm with its curved face in contact with the curved part of a semi-circular detent 3650$^b$. The latter is formed as the head of a plug 3650$^B$ journaled in a boss on the casing cap 3655$^B$ (Fig. 3). Under these conditions the arm assumes a position which through the co-action of the segmental gears causes the pin 3655$^a$ to present its flat side to the notched or grooved periphery of the constantly rotating annulus as shown in Fig. 5. Hence of course the latter rotates without affecting the disk 3666¾$^B$. When, however, the detent 3650$^b$ is rocked in such manner as to disengage it from the head of the arm 3690$^B$ the latter is instantly drawn over by the spring 3687 and through the medium of the segmental gears the clutch pin 3655$^a$ is turned and carried into the passing notch or groove of the annulus as illustrated in Fig. 6. This effects a positive union of the annulus and the disk so that thereupon the shaft 3600 will be rotated and power transmitted to the adding machine. It is highly desirable if not practically essential that the said shaft shall be limited in continuous operation to a single rotation so that time will be insured for a proper restoration of the adding machine parts to normal. Hence the detent 3650$^b$ must be returned to position for contact with the arm 3690$^B$ before the latter completes a rotation and preferably immediately the arm has escaped it when an operation is started. Means are therefore provided for causing the first movement of the adding machine parts to restore this detent to effective position. The means here shown for controlling the detent are of the following description: There is secured to the outer end of the detent plug 3650$^B$ a disk 3616$^B$ having a gear segment in mesh with a similar segment on an arm 3615$^B$ pivoted to the casing just below the detent plug as shown in Fig. 2. The arm 3615$^B$ carries an eye 3651¼$^e$ through which extends loosely the rod-like portion of a bar 3627, the latter standing vertically alongside the working parts of the adding machine and extending to the upper part of the latter as shown in Fig. 1. A nut 3630½ is applied to the lower end of this bar as shown in Fig. 2 and it will be seen that the elevation of the bar will cause this nut to lift the arm 3615$^B$ and through the described segmental gears rock the detent plug and disengage its semi-circular head from the arm 3690$^B$ of the clutch mechanism. The key-board equipment for putting in reach of the operator convenient means for tripping the detent comprises a bar 3698 (Fig. 1) extending along the right-hand column of amount keys 291. This bar has legs 3622 which engage the outer ends of levers 3612 and 3613, the latter being pivoted intermediate their ends and connected by a spring 3688 for holding the said bar 3698 normally elevated. The two levers are jointed together between their pivots and the lever 3612 extends rearwardly from such coupling point and carries a stud engaging a slot in the upper end of a bar 3627. A spring 3682 connects this rearwardly-extending portion of the lever 3612 with said bar 3627. It will be seen that through the described connections depression of the bar 3698 will cause elevation of the bar 3627.

For the purpose of causing restoration of the detent automatically immediately after the machine starts to operate the above-described bar 3627 is formed with a forward projection 3649$^a$ standing below a stud 3649 on the sector 311. When the bar 3627 is elevated by depression of the starting bar 3698 this forward projection moves into close proximity to said stud so that as the sector starts to operate this stud will act to depress the bar 3627 and consequently restore the detent to normal position ready to obstruct the clutch arm 3690$^B$ as it completes a rotation.

The vertical bar is preferably provided with a projection 3627$^b$ (Fig. 1) adapted when the bar is elevated to enter the space through which the handle must pass in connecting with the shaft 300 and thus prevent the application of the handle while the detent is out of normal position. Correspondingly when the handle is applied to the shaft 300 the bar 3627 cannot be elevated. A spiral spring 3684$^A$ surrounds the rod-like portion of said bar 3627 (see Fig. 2) and constitutes the medium through which the arm 3615$^B$ is restored to normal by the lowering of said bar. The purpose of interposing this spring is to provide for the lowering of the bar by hand in case of a mishap which might otherwise leave the machine in such shape that it could be operated neither by hand nor by the motor.

Even in a single rotation the clutch parts will of course acquire some momentum and as there is a possibility that when the clutch arm 3690$^B$ abuts the detent 3650$^b$ and the clutch pin 3655$^a$ is thereby disengaged from the notched annulus there might occur an immediate reëngagement through rebound of the driven parts, means are provided for prohibiting any such rebound. The wrist-pin of the crank arm carries a pawl 3612¼ adapted to wipe over a fixed stud 3633½ (see Fig. 8) on the gear casing and take up a position behind the same as shown in Fig. 7 just as the rotation is completed. Thus a positive back-stop is provided which effectively prevents any rebound. The pawl has an angular arm connected by a spring 3688 with a stud 3658¼ on the crank 3691ᴮ, said spring holding this angular arm of the pawl normally against said stud but of course yielding as the pawl wipes over the fixed stud 3633½.

What is claimed is:

1. The combination of a constantly rotatable driving member carrying an annulus formed throughout its periphery with a continuous series of notches struck on arcs, a rotary driven member having a part encircling the notched annulus and carrying a rocking clutch piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, a detent normally restraining the arm with the effect of tensioning the spring, and means for controlling the detent.

2. The combination of a constantly rotatable driving member carrying an annulus formed throughout its periphery with a continuous series of notches struck on arcs, a rotary driven member having a part encircling the notched annulus and carrying a rocking clutch piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, an oscillatory detent normally engaging said arm to prevent its movement in a direction to engage the clutch piece with the notched annulus, and manipulative means for turning the detent to release the arm.

3. The combination of a constantly rotatable driving member carrying an annulus formed throughout its periphery with a continuous series of notches struck on arcs, a rotary driven member having a part encircling the notched annulus and carrying a rocking clutch piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, an oscillatory detent normally engaging said arm to prevent its movement in a direction to engage the clutch piece with the notched annulus, manipulative means for turning the detent to release the arm, and automatic means for restoring the detent to effective position.

4. The combination of a constantly rotatable driving member carrying an annulus formed throughout its periphery with a continuous series of notches struck on arcs, a rotary driven member having a part encircling the notched annulus and carrying a rocking clutch piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, a detent normally restraining the arm with the effect of tensioning the spring, means for controlling the detent, and a back-stop for preventing reverse movement when the driven member has completed a rotation and the clutch-piece is restored to normal.

5. The combination of a constantly rotatable driving member carrying an annulus formed throughout its periphery with a continuous series of notches struck on arcs, a rotary driven member having a part encircling the notched annulus and carrying a rocking clutch-piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, an oscillatory detent normally engaging said arm to prevent its movement in a direction to engage the clutch piece with the notched annulus, manipulative means for turning the detent to release the arm, and a back-stop for preventing reverse movement when the driven member has completed a rotation and the clutch-piece is restored to normal.

6. The combination of a constantly rotatable driving member carrying an annulus formed throughout its periphery with a continuous series of notches struck on arcs, a rotary driven member having a part encircling the notched annulus and carrying a rocking clutch piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, an oscillatory detent normally engaging said arm to prevent its movement in a direction to engage the clutch piece with the notched annulus, manipulative means for turning the detent to release the arm, automatic means for restoring the detent to effective position, and a back-stop for preventing reverse movement when the driven member has completed a rotation and the clutch-piece is restored to normal.

7. The combination of a constantly rotatable driving member carrying an annulus formed throughout its periphery with a continuous series of notches struck on arcs, a rotary driven member having a part encircling the notched annulus and carrying a rocking clutch piece semicircular in cross-section and adapted to engage any one of the notches in the annulus, an arm journaled concentrically with the driving and driven members and geared to said clutch piece with provisions for limited movement to engage the latter with and disengage it from the notched annulus, said arm being spring-actuated in a direction to effect engagement of said parts, a detent normally restraining the arm with the effect of tensioning the spring, means for controlling the detent, a crank compounded with the driven member, a spring-held pawl pivoted on said crank, and a fixed stud in the path of said pawl and over which the latter wipes as the driven member completes a rotation.

JESSE G. VINCENT.

Witnesses:
HUGH H. PHELPS,
ROYAL STEWART MIELERT.